Oct. 4, 1966 R. GROTE 3,277,242

PARTY LINE CIRCUIT ARRANGEMENT

Filed Aug. 23, 1963 2 Sheets-Sheet 1

United States Patent Office 3,277,242

Patented Oct. 4, 1966

3,277,242

PARTY LINE CIRCUIT ARRANGEMENT

Richard Grote, Munich, Germany, assignor to Siemens & Halske Aktiengesellschaft, Berlin and Munich, a corporation of Germany Filed Aug. 23, 1963, Ser. No. 304,151
Claims priority, application Germany, Sept. 14, 1962, S 81,450
4 Claims. (Cl. 179—17)

Figure 1:
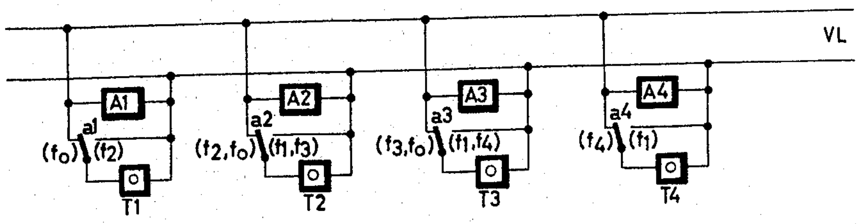

The invention disclosed herein is concerned with a circuit arrangement for party lines in communication systems, particularly telephone systems, wherein only one of a plurality of subscriber stations is to be at any one time operatively effectively connected to a common line.

Numerous arrangements have become known which are concerned with the problem underlying the present invention, namely, the problem of economically utilizing expensive communication lines. Many of these known arrangements, while allowing extension of individual calls from the respective party line stations, suffer the drawback that they do not permit communication between individual party line stations to the exclusion of other stations on the same party line, or extension of calls from individual party line stations over exchange lines, to the exclusion of other stations on the same party line; putting it in other words, these known arrangements or systems do not provide for secrecy of calls.

Other known party line arrangements, which provide for secrecy of calls, entail various disadvantages and require great expenditure for the operative connection of individual subscriber stations so as to initiate the extension of outgoing calls. Arrangements have thus become known, in which capacitors are provided at the individual party line stations, whereby the charge which is in normal condition assumed by the respective capacitor, suffices for operatively energizing the switch-in relay of the corresponding station, responsive to closure of the switch-hook contact. Owing to the low ohmic line loop, the voltage drops along the common party line to a value which is so low that the capacitor charges at the remaining party line stations are insufficient for the operative energization of the switch-in relays cooperatively associated with such stations. A disadvantage of this arrangement resides primarily in the great influence of the line resistance, which makes it in given circumstances necessary to provide for different energizing sensitivity of the switch-in relays of the stations connected along the respective party line.

It is also known to provide switches at the individual branching points, to assign to each switch output a subscriber station, and to simultaneously actuate all of these switches in step-like manner, by current impulses which are extended via one conductor of the communication line and ground. A testing circuit is formed via the second conductor of the communication line, such testing circuit becoming operatively effective to prevent transmission of further stepping impulses when the respective switch assumes a position corresponding to the calling subscriber station. A considerable disadvantage of this system resides in that it is necessary to use at all subscriber stations a ground connection for the transmission of the current impulses required for the actuation of the switches.

Other known circuit arrangements utilize different selection criteria, for example, alternating currents of different frequencies, which are respectively assigned to the individual party line subscriber stations. In these arrangements or systems, outgoing connections are initiated either by starting means at the exchange, which are operatively effective via the line, generally by utilizing a ground connection, such starting means determining, in the manner of call finders, the party line subscriber station from which a call is to be extended, or by the provision, at the individual party line stations, of means which are operative not only for receiving but also for transmitting individual station selection criteria, which make it possible to effect, in the exchange, a direct identification of calling party line stations. Arrangements of this kind entail considerable expenditures.

The object of the invention is to avoid the disadvantages of the known arrangements and to reduce the expenditures required therefor. The invention is characterized by the following features, namely (a) the current circuits for the transmission of selection criteria, for the initiation of outgoing connections and for the testing of the involved subscriber line loop extend via both conductors of the common communication line, which conductors are connected in series and (b) the selection criteria which are effective in continuous sequence, affect switching means allotted to the respective party line stations in such a manner, that all subscriber stations which are in normal or resting condition connected by two conductors to the common communication line are, with the exception of the first such station, disconnected from this communication line, each further criterion causing the switching-in of a further subscriber station and disconnection of the one which is ahead thereof, and the last criterion being operative to again reconnect to the common line all subscriber stations except possibly the last station.

Accordingly, an important advantage of the invention resides in that ground connections for the signal transmission are avoided and that normal subscriber stations can be used. Moreover, no restoring steps are required in determining a calling subscriber station in an operation similar to that performed by a call finder, and such determination can therefore be effected very quickly.

According to another object and feature of the invention, the station selection criteria utilized, for example, alternating currents of different frequency, makes it possible to double the number of subscriber stations which are to be connected to a common line, simply by forming two groups of stations which are distinguishable with the aid of oppositely poled gates. An arrangement of this kind is thereby characterized that identical selection criteria are assigned to respective pairs of subscriber stations in the two groups and preventing the listening-in between the respective two subscriber stations in known manner by electrical gates inserted into the corresponding line conductors. Upon utilizing, as selection criteria, alternating currents of different frequencies, there may be used, according to a further feature of the invention, bistable polarized relays to serve at the individual subscriber stations as switch-in means, whereby such relays are operatively energized and released in simple series resonance circuits. It is in such case possible to provide each two of these series resonance circuits with a common capacitance, and to form the two inductances by a single coil provided with a tap.

Further details and features of the invention will appear from the description which is rendered below with reference to the accompanying drawings.

Figure 2A:
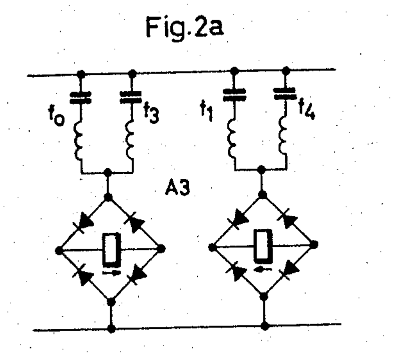
Figure 2B:
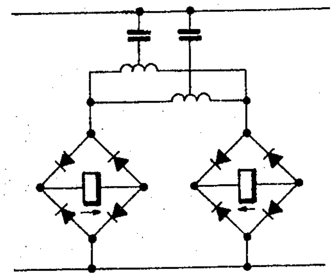

FIG. 1 shows a circuit for connecting subscriber stations to a common two-conductor line with the aid of contracts controlled by frequency dependent switching devices;

FIGS. 2*a* and 2*b* indicate frequency receiving circuits; and

Figure 3:
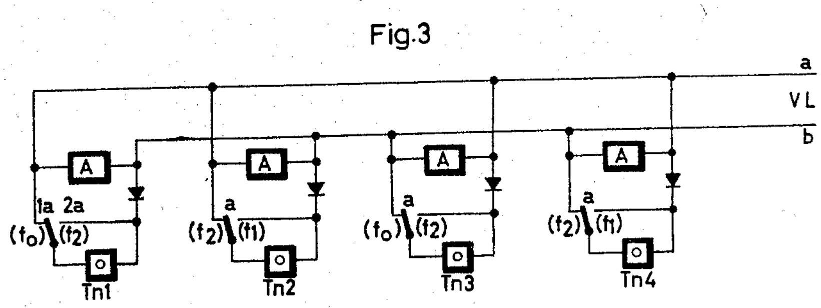
Figure 4:
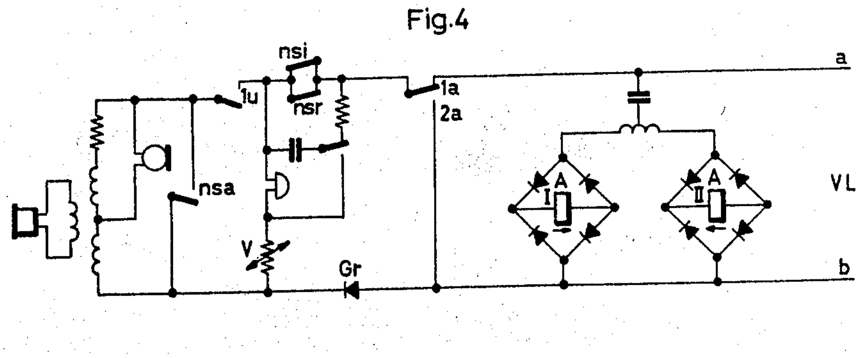
Figure 5:
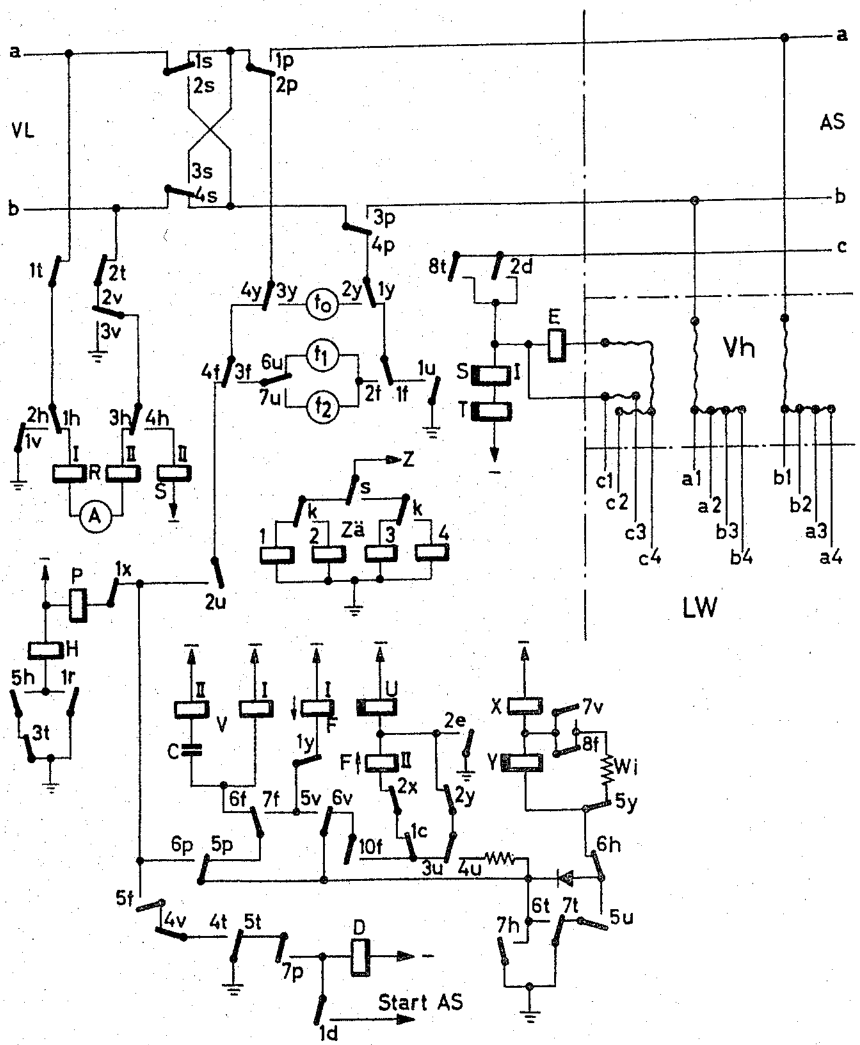

FIGS. 3 to 5 represent a circuit arrangement for connecting to a common line four subscriber stations which are subdivided into two groups each including two stations; FIG. 3 showing the basic arrangement, FIG. 4 a subscriber station in a circuit known from the two-station technique and also the frequency receiving circuit for the respective station, and FIG. 5 representing the exchange transmission.

Referring now to FIG. 1, T1 to T4 indicate subscriber stations which are to be connected to the common line VL with the aid of contacts *a*1 to *a*4 which are respectively controlled by frequency dependent switching devices A1 to A4. The bracketed matter in connection with the individual contacts indicates frequencies $f_0$ to $f_4$ of alternating currents which are operative to respectively operatively energize and deenergize the associated frequency-dependent switching devices. It will be immediately apparent that all stations except the station T1 will be disconnected from the common line VL and short-circuited to as to prevent listening-in, responsive to connecting thereto the frequency $f_1$ and that the subscriber station T2 will be connected to the common line responsive to the frequency $f_2$, while T1 is disconnected, the remaining subscriber stations remaining disconnected, etc. All subscriber stations with the exception of the last station, which was connected by the frequency $f_4$, are responsive to the frequency $f_0$ connected with the common line and thus enabled again for initiating outgoing calls.

The frequency receiving circuits shown in FIGS. 2*a* and 2*b* comprise respectively a bistable polarized relay A having an actuating winding AI and a restoring winding AII. Both windings are disposed in the diagonal branches of bridge rectifiers the input terminal pairs of which are in series resonance circuits, so that they become operatively effective at the respective resonance frequencies. As indicated in FIG. 2*b*, the capacitances of the respective series resonance circuits for the actuating- and restoring-windings can be combined, while the cooperating inductances can be formed by single coils provided with a tap.

FIG. 3, which shows the basic arrangement, indicates four subscriber stations T*n*1 to T*n*4, subdivided into two groups each with two stations, which are connected to the conductor *a* and *b* of the common line VL. The two groups are distinguished by oppositely polarized electrical gates G*r* which are disposed in the branch lines extending to the individual subscriber stations, such gates preventing listening-in between two stations to which is assigned the same selection frequency, for example, stations T*n*1 and T*n*3.

The circuit arrangement according to the invention will now be described more in detail, particularly with reference to FIG. 4, showing one of the subscriber stations in a circuit known from the two-station technique as well as the frequency receiving circuit therefor, and with reference to FIG. 5 which shows the exchange transmission.

The operation of the circuit arrangement is as follows.

When an outgoing call is to be extended from one of the subscriber stations T*n*1 to T*n*4, there will be produced a circuit, responsive to the removal of the hand set at the corresponding station, in which the relay R in the exchange transmission (FIG. 5) is operatively energized by the alternating voltage of the generator A, which voltage is rectified in the rectifier G*r* at the subscriber station (FIG. 4):

(1) R (winding I), 1*h*, 1*t*, line conductor *a*, contact 1*a*, (FIG. 4), subscriber loop, line conductor *b*, contact 2*t* (FIG. 5), contact 2*v*, 3*h*, R (winding II), generator A.

Contact 1*r* of the relay R closes an energizing circuit for the relay H:

(2) Ground, 1*r*, H, —; relay H closing its contact 5*h* and thereby closing a holding circuit for itself—

(3) Ground, 3*t*, 5*h*, H, —.

Relay H also opens its contacts 1*h*, and 3*h*, thereby causing the relay R to restore. In the event that the subscriber loop had been closed at the station T*n*3 or T*n*4, there will be produced via contacts 2*h* and 4*h* a circuit in which the relay S can energize via its winding II:

(4) Ground, 1*v*, 2*h*, 1*t*, line conductor *a*, 1*a*, subscriber line loop, G*r* (in pass direction), line conductor *b*, 2*t*, 2*v*, 4*h*, S(II), —.

However, if the call was initiated at the subscriber station T*n*1 or T*n*2, the associated rectifiers G*r* operate in blocking sense and the relay S is not energized.

Relay S prepares in the manner known from the two-station technique, a reversal of polarization of the battery feed voltage on the line conductors, thus preventing the listening-in between two subscriber stations which are distinguished by oppositely poled rectifiers and to which is assigned the same station selection frequency.

Relay H also closes its contact 7*h* (bottom right in FIG. 5), thereby closing a circuit for the energization of relay V via its winding I:

(5) Ground, 7*h*, 5*p*, 6*f*, V(I), —.

Relay V actuates its contact 5*v*, thereby causing energization of the relay F via its winding I, in a circuit:

(6) Ground, 7*h*, 5*v*, 1*y*, F(I), —.

Relay F closes a holding circuit for itself via its contact 7*f*, and connects at its contacts 2*f* and 3*f* the station selection frequency $f_1$ to the line conductors *a* and *b* of the line VL:

(7) Generator $f_1$ 6*u*, 3*f*, 4*y*, 2*p*, line conductor *a* . . . line conductor *b*, 4*p*, 1*y*, 2*f*, generator $f_1$.

The frequency devices or relays A become operative at the subscriber stations T*n*2 and T*n*4, in the previously described manner, and disconnect these stations from the common line.

Relay V restores after a delay interval determined by the capacitor C, thus producing via its contact 6*v*, an energizing circuit for the relay U:

(8) Ground, 7*h*, 6*v*, 10*f*, 3*u*, 2*y*, U, —.

Relay U connects itself via contact 4*u*, in a holding circuit:

(9) Ground, 7*h*, resistor W*i*, 4*u*, 2*y*, U, —; and opens at its contact 3*u* the short circuit about its winding FII. This winding FII becomes operative in the circuit:

(10) Ground, 7*h*, 6*v*, 10*f*, 1*c*, 2*x*, FII, U, —; and causes quick restoration of the relay F. A circuit is now closed via the contacts 1*f*, and 4*f* for the testing of the subscriber loop by the relay P. In the event that the call originated at the subscriber station T*n*1 or T*n*3, the relay P can energize in the circuit:

(11) Ground, 1*u*, 1*f*, 1*y*, 4*p*, 4*s*, line conductor *b*, G*r* (in pass direction), subscriber station 1, 1*a*, line conductor *a*, 1*s*, 2*p*, 4*y*, 4*f*, 2*u*, 1*x*, P, —; or in a corresponding circuit via the contacts 2*s*, and 3*s* and the subscriber station 3. Relay P closes a holding circuit for itself via its contact 6*p*, opens its contact 5*p* to prevent renewed energization of the relay V, and connects via its contacts 1*p*, and 3*p* the two line conductors *a* and *b* through to the call finder AS.

However, in case the call originated at the subscriber station T*n*2 or T*n*4, there will not be produced an energizing circuit for the testing relay P and the relays V and F are again successively energized in the circuits (5) and (6). Since the relay U is still in actuated position, the station selection frequency $f_2$ will be transmitted to the line via the contact 7*u*. The frequency relays A become again operative at the subscriber stations. The contacts 1*a* at the subscriber stations T*n*1 and T*n*3 are opened and those at the stations T*n*2 and T*n*4 are closed, thus permitting operative energization of the test relay P in a circuit corresponding to the circuit (11). Relay P connects the line conductors through to the call finder AS and closes at its contact 7*p* a circuit for the relay D:

(12) Ground, 5*t*, 7*p*, D, —.

Relay D actuates its contact 1*d*, thereby starting the operation of the call finder AS, and prepares at it contact 2*d* a test circuit for the call finder. The testing of the call finder is effected in the circuit:

(13) Ground, (AS) . . ., private conductor *c*, 2*d*, S(I), T, —; wherein the relay S(I) receives non-operate current, that is, current which is insufficient for its operative actuation, while relay T is operatively energized. Contact 5*t* is accordingly opened, thereby interrupting the circuit (12) and stopping the operation of the call finder.

The holding circuit (3) for the relay H is likewise interrupted, by the opening of the contact 3*t*, and contact 7*h* is bridged by the contact 6*t*, thus forming new holding circuits for the relays V and U, relay S being held further in the circuit (13).

The operative connection of the individual call meters *Za* can be effected in simple manner via contacts of the relay S and contacts of an auxiliary relay K (not shown) which is energized responsive to the second energization of the relay F.

Upon release of the connection, relays T and P will successively deenergize thus enabling operative actuation of relay X in the circuit:

(14) Ground, 7*t*, 5*u*, 6*h*, $$\frac{5y,\ Wi,\ 8f}{Y}$$

X, —.

Relays V and F energize in the circuits:

(15) Ground, 7*t*, 5*u*, G1, 5*p*, 6*f*

$$\frac{V(I)}{C,\ V(II)}$$

—, and

(16) Ground, 7*t*, 5*u*, G1, 5*v*, 1*y*, F(I).

The contact 2*x* disconnects the winding F(II) from ground potential, thus preventing the release of relay F by opposing energization. So long as relay F is actuated, the selection frequency $f_2$ will again become effective on the line and will cause connection (switching-in) of the subscriber stations T*n*2 and T*n*4 and disconnection of T*n*1 and T*n*2, insofar as this condition is not yet established. The relay Y which has already been preenergized in the circuit (14), can operatively energize upon delayed release of the relay V while the relay F is still actuated. Upon energizing, relay Y connects via its contacts 2*y*, and 3*y*, release frequency $f_0$ to the line conductors, thus effecting, in accordance with the invention, the connection of the subscriber stations T*n*1 and T*n*3 to the line VL, and thereby again restoring the normal or resting condition.

In the case of incoming calls, the relay E will mark the subscriber stations T*n*2 and T*n*4, while the differentiation, on the one hand between the subscriber stations T*n*2 and T*n*4, and on the other hand between the stations T*n*3 and T*n*4, which are marked by oppositely poled rectifiers, is effected by interchange of the line conductors in the main distributor V*h*.

For example, when the connector LW is stepped to the terminals corresponding to the subscriber station T*n*2, relays E and T will be operatively energized in the circuit:

(17) Ground (LW), private conductor *c*, E, S(I), T, —.

Relay E closes its contact 2*e* to complete a circuit for energizing relay U:

(18) Ground, 2*e*, U, —.

Relays V and F are successively operatively actuated in the circuits (15) and (16). The station selection frequency $f_2$ is in the previously described manner connected to the line conductors and the subscriber stations T*n*1 and T*n*3 are disconnected from the common line. Upon restoration of the relay V responsive to opening of the contact 6*f*, relay P is operatively energized in the circuit:

(19) Ground, 4*t*, 4*v*, 5*f*, 1*x*, P, —.

Relay P, upon energizing, interrupts the circuits (15) and (16) and switches the line conductors *a* and *b* through to the connector LW.

The operations described in connection with the circuits (14) and (16) are repeated upon conclusion of the call and effect the release of all relays.

Changes may be made within the scope and spirit of the appended claims which define what is believed to be new and desired to have protected by Letters Patent.

I claim:

1. A circuit arrangement for a communication system, especially a party line telephone system, comprising means for producing alternating currents of different frequencies, constituting particular station selection criteria, whereby only one of a plurality of subscriber stations is to be at any one time operatively effectively connected to a common two-conductor line, for communication with an exchange subscriber, to the exclusion of other stations on the party line, means connected to said means for producing alternating currents and connected in series with said common two-conductor line for transmitting the station selection criteria in continuous succession for the initiation of outgoing connections and for the testing of a respective calling station, switching means at the respective subscriber stations responsive to said criteria, a first criterion causing said switching means to disconnect from the common line all subscriber stations except the first station, each further criterion being operative to effect connection of a further subscriber station and disconnection of the respectively preceding station, and the last criterion being effective to operatively connect with the common line all stations except the last station.

2. A circuit arrangement according to claim 1, comprising polarized relays constituting said switching means, said relays being disposed in series resonance circuits for the operative energization and deenergization thereof.

3. A circuit arrangement according to claim 2, comprising a common capacitance for a series resonance circuit for the operative actuation of one of said switching means and for a further series resonance circuit which is operable to restore said switching means to normal, the inductances of said resonance circuits being formed by a single coil with a tap.

4. A circuit arrangement according to claim 3, comprising two groups of subscriber stations which are distinguishable by the provision of oppositely poled electrical gates, the same station selection criterion being assigned to one subscriber station of each group, and electrical gate means disposed in the line conductors for preventing listening-in between the subscribers in the respective groups.

No references cited.

KATHLEEN H. CLAFFY, *Primary Examiner.*

H. ZELLER, *Assistant Examiner.*